Figure 6:
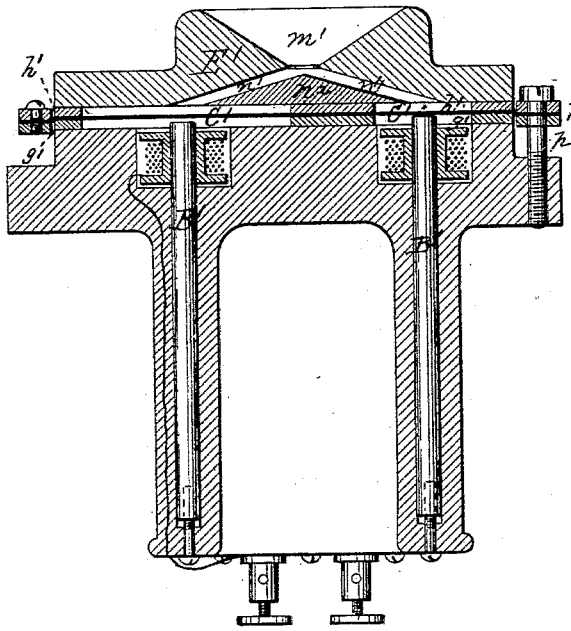

2 Sheets—Sheet 1.
R. EICKEMEYER.
Diaphragms for Telephones and Phonographs.
No. 210,929.  Patented Dec. 17, 1878.
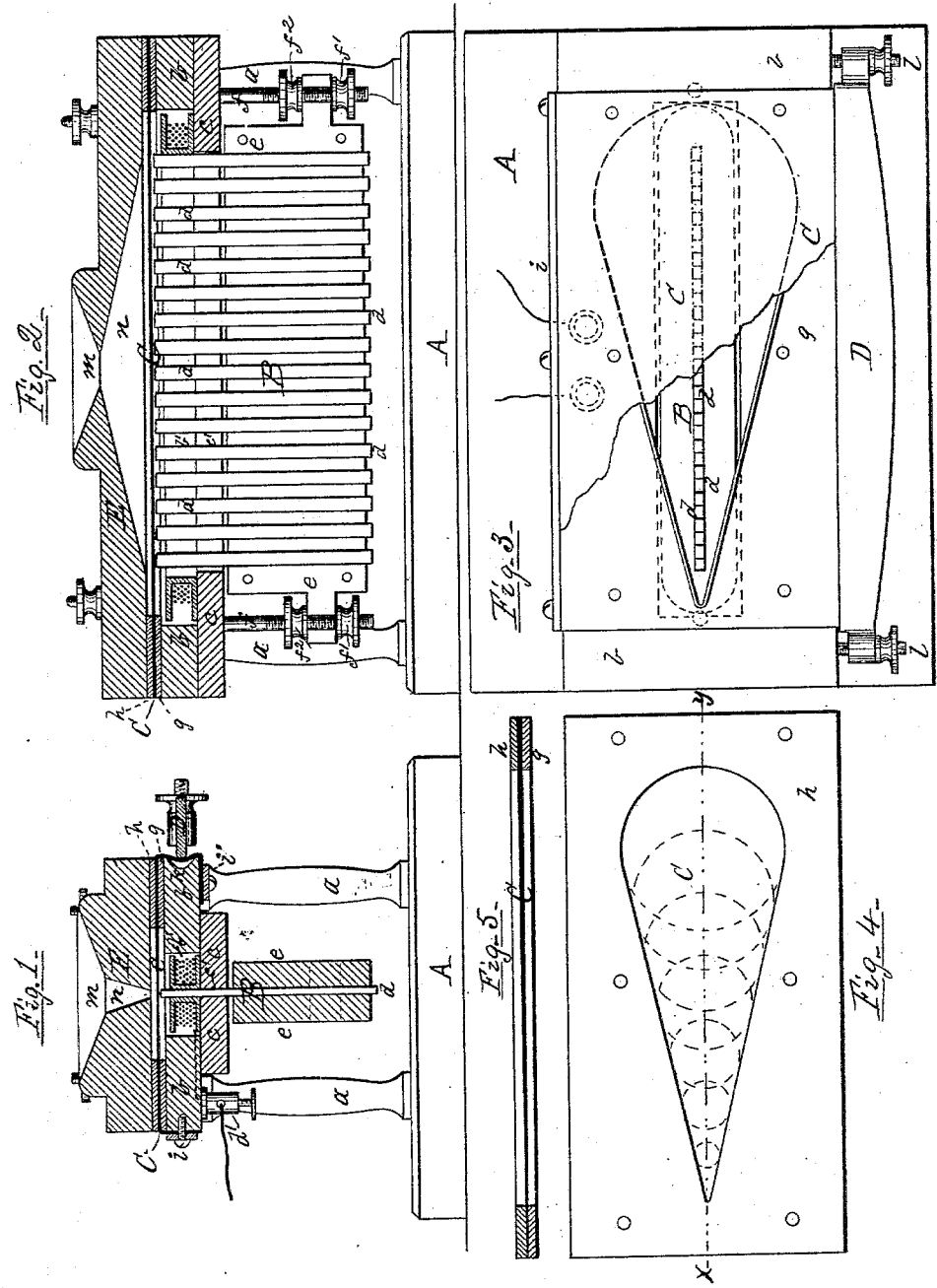

2 Sheets—Sheet 2.

R. EICKEMEYER.
Diaphragms for Telephones and Phonographs.

No. 210,929. Patented Dec. 17, 1878.

Witnesses:
Philip F. Larner
H. Bartle

Inventor:
Rudolf Eickemeyer
By _____ Atty.

UNITED STATES PATENT OFFICE.

RUDOLF EICKEMEYER, OF YONKERS, NEW YORK.

IMPROVEMENT IN DIAPHRAGMS FOR TELEPHONES AND PHONOGRAPHS.

Specification forming part of Letters Patent No. 210,929, dated December 17, 1878; application filed August 13, 1878.

*To all whom it may concern:*

Be it known that I, RUDOLF EICKEMEYER, of Yonkers, in the county of Westchester and State of New York, have invented certain new and useful Improvements in Telephones and Diaphragms for Telephones, Phonographs, and other similar apparatus; and I do hereby declare that the following specification, taken in connection with the drawings furnished and forming a part of the same, is a true, clear, and complete description of my invention.

My diaphragms are intended for service in instruments of various kinds, whether for transmitting, receiving, recording, or reproducing sounds; and the object of my improvement is to increase the capacity of the diaphragm to vibrate in true response to a greater variety of tones than heretofore, so that the sounds transmitted or received by it shall more closely resemble the original sounds and possess a quality or timbre closely approximating to that of the human voice.

So far as my knowledge extends a diaphragm of this class has never been heretofore graduated in its vibrating capacities, so that one portion thereof would vibrate in true harmony with a certain tone, and other portions in true harmony with other tones. This graduated vibrating capacity is the main novel characteristic of my diaphragm, of which it may be truly said that it is tuned to respond equally well to all tones within its range, and one of my diaphragms therefore contains or possesses the characteristics or capacities of many specially-tuned diaphragms or tympans, or other analogous devices by whatever name known, as heretofore constructed. This graduated vibrating capacity in a diaphragm is attainable in various ways, the most desirable of which are by constructing it with a graduated bulk, or by a graduated straining or tightening thereof. This latter method may be applied to metallic diaphragms, but is specially well adapted to such as are non-metallic, like gold-beaters' skin, parchment, &c.

The graduation in the bulk of the diaphragm may be attained by two methods, either graduating its thickness, as especially adapted to metallic diaphragms, or graduated in width, as applicable to both metallic and non-metallic diaphragms; or a diaphragm may be graduated in thickness and width, and also by unequal straining, or by either two of these three methods.

My invention mainly consists in a diaphragm which is variably tuned, thereby securing for it a graduated vibrating capacity.

My invention further consists in a diaphragm which is graduated in its thickness, still further in a diaphragm which is graduated in its width, and still further in a diaphragm which is unequally strained at different portions thereof, so that its tension is thereby graduated.

Such diaphragms are of practical value when used with a single magnet which acts at one point only, because those parts of the diaphragm which are in unison with the overtones of any set of vibrations caused by the sending-instrument will respond and furnish the whole scale of overtone in the receiving-instrument.

Another novel feature consists in the combination, with a diaphragm which is variably tuned, of a magnet or magnets, these being arranged to engage with the diaphragm in a continuous line, or nearly so, in order that vibrations at various portions of the diaphragm will be communicated through the magnet, as in sending, and also so that undulating pulsations through the magnet will be communicated to various portions of the diaphragm, as in receiving.

The arrangement of the several magnets in a line longitudinally and centrally with relation to the diaphragm, as shown, induces vibrations in lines at right angles to the line occupied by the magnets.

Certain other features of invention relate to the particular device employed by me for unequally straining the diaphragm, and also to the mouth-piece, which is of novel and peculiar construction, as hereinafter described.

To more particularly describe my invention, I will refer to the accompanying drawings, in which—

Figure 8:
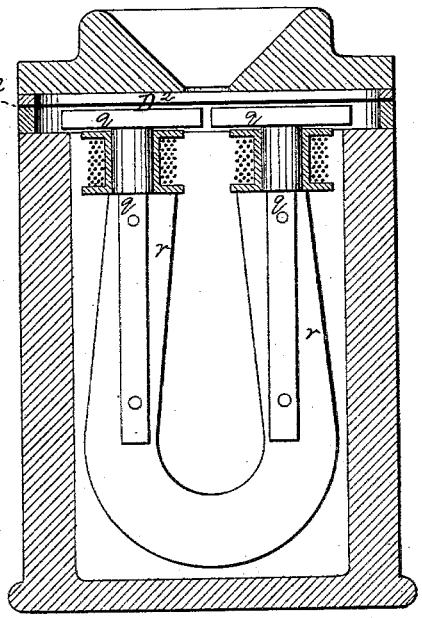
Figure 7:
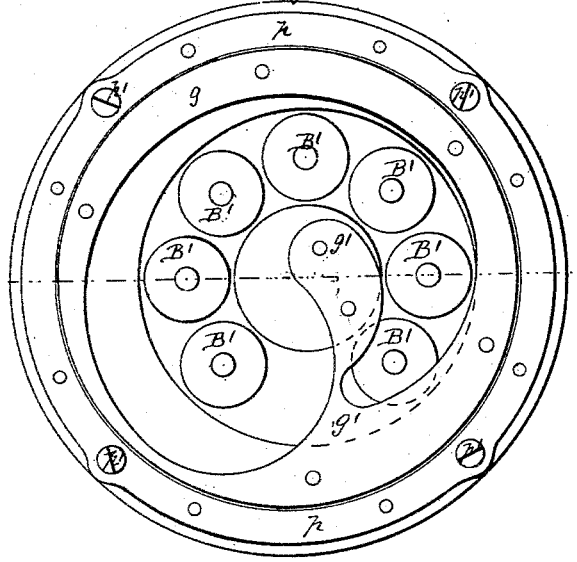
Figures 9, 10:
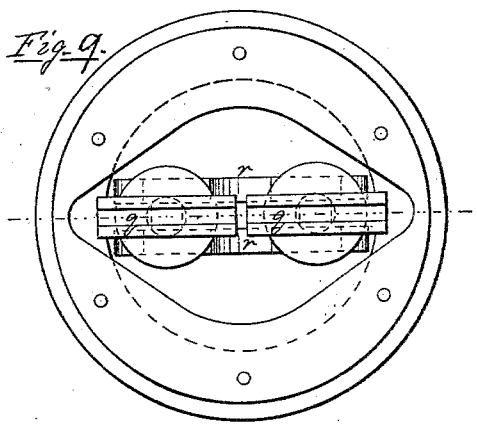

Figure 1 represents, in central lateral vertical section, a telephone embodying one form of my improved diaphragm. Fig. 2 represents the same in central longitudinal vertical section. Fig. 3 represents the same in top view with the cap-plates and mouth-piece removed down to the diaphragm, which is partially broken away. Fig. 4 represents, in top view, the diaphragm and its clamping-plates. Fig. 5 is a longitudinal central section of Fig. 4 on line $x\,y$. Fig. 6 is a central vertical section of a hand-telephone embodying my diaphragm in another form. Fig. 7 is a top view of the same with mouth-piece, cap-plate, and diaphragm removed. Fig. 8 is a central vertical section of a hand-telephone provided with another form of diaphragm. Fig. 9 is a top view of the same with the mouth-piece, cap-plate, and diaphragm removed. Fig. 10 is a section through a diaphragm for telephone, Figs. 8 and 9.

The telephone, Figs. 1 and 2, is mounted on a frame consisting of a base-plate, A, four standards, $a$, and top $b\,c$. The top of the frame is composed of two parts—that at $b$ resting upon the legs, and that at $c$ secured to the under side of part $b$. The upper part of the top $b$ is provided with a central rectangular opening, $b'$, for most of its length, and the lower part, $c$, has also a narrower central longitudinal slot, $c'$. The magnet B is in this instance composed of sixteen bars, $d$, arranged in a row clamped between wooden plates $e$, and supported on end screws $f$, which extend downward from the top of the frame between the legs. Each screw $f$ is provided with an adjusting-nut, $f^1$, and a set-nut, $f^2$. The bars on the magnet extend upward through the slots $c'$ and $b'$ slightly above the top, and their upper ends are squared off in a true line. The upper ends of the magnet-bars are, considered as a whole, encircled by magnet-wire in the usual manner, the spool occupying the slot $b'$ in the top of the frame. The magnet-coil is, as usual, connected with the screw-posts $d'$.

C denotes an improved diaphragm. In this instance it is a portion of a thin metallic diaphragm-plate, which is confined between a bed-plate, $g$, of metal, and a cap-plate, $h$, preferably of wood. The diaphragm proper is that portion of the plate which is susceptible to vibration, and all other portions of said plate merely constitute the medium whereby the diaphragm proper is mounted or controlled. The cap and bed plates are each provided with an aperture which in outline is an elongated triangle, with its base-line curved in the arc of a circle having a diameter equal to the width of the base. The bed-plate may have the edge of its aperture turned upward slightly, and on this edge the diaphragm-plate will bear when the cap-plate is applied, so that the vibrations can extend only from edge to edge. This diaphragm-plate is thicker at one end than at the other, as shown in Fig. 5, and its width gradually decreases from its widest end. For so mounting the diaphragm that it may be unequally strained, the plate is bent downward at one edge and firmly secured to one side of the top $b$ of the frame by means of a clamping-bar, $i$, and several screws. The opposite edge of the top $b$ is recessed or concaved longitudinally at $k$, and the diaphragm-plate is bent downward over this recess, and thence inward below the top, and is there firmly secured by another clamping-bar and its screws, as at $i'$, Fig. 1.

The employment of an annular straining device which operates on all sides of a diaphragm and induces tension in all directions—as, for instance, in banjos, drums, &c.—will not provide for the unequal straining which is desirable in a diaphragm of the character herein described.

The unequal tension or strain on my diaphragm is effected by means of the straining-bar D, which is mounted on screws $l$ in the edge of the top $b$, and has a rounded edge for bearing against the diaphragm-plate throughout its length in a line parallel with the center of the recess $k$.

With this construction it will be seen that by turning the screws equally the entire diaphragm will be strained to any desirable tension, and also that by turning the screw opposite the narrow end inward more than the other the tension of the diaphragm will be unequally but regularly graduated from the wide end to the narrow end, and that therefore this diaphragm has a graduated capacity for vibration, due in part to its graduated thickness, in part to its graduated width, and also in part to its graduated tension. This graduated capacity for vibration would of course be present to an approximate degree if the diaphragm were of uniform width and equal thickness, but unequally strained, or if equally strained and of uniform width, but of unequal thickness, or if equally strained and of equal thickness, but of a graduated width. The diaphragm of the form shown possesses the combined characteristics of numerous disks, as indicated in dotted lines in Fig. 4, varying in diameter according to the width of the diaphragm; and as there are sixteen bars to the magnet the diaphragm may be considered as having the capacity of sixteen disks graduated in size, and also in their vibrating capacities; or, instead of disks, the lines of vibration extended from side to side may be compared in this instance to numerous strings or wires, as in a harp, each string being specially capable of responding in its vibration to some particular tone. With a diaphragm of this complex character a great variety of sound-undulations are attained. It will be seen that the magnet may be adjusted to the diaphragm with the greatest possible accuracy.

The mouth-piece E of this telephone is of novel and peculiar form. The mouth-piece has the usual circular funnel-shaped outer aperture, $m$, which communicates centrally with the center of a novel inner chamber or aperture, $n$, this latter being long, narrow, extended each way from the center beyond the ends of the line of magnets, and is possessed also of the characteristics of a funnel, the smallest portion of which communicates centrally with the smallest portion or center of the outer aperture, m. The best results are attained when the intervening space between the diaphragm and rear side of the mouth-piece is reduced to a minimum, care being taken that no contact occurs. With this form of mouth-piece the sound is specially directed to that portion of the diaphragm which overlies the magnets. The mouth-piece is preferably of wood, and is secured to the frame and clamped upon the cap-plate h by four screws, o.

Of the mechanical features thus far combined, I include as a portion of my invention the combination, with the diaphragm, regardless of the material of which it may be composed, of a straining-bar arranged to unequally strain the diaphragm.

The telephone, Figs. 6 and 7, is of a different form—of the class which are held by the hand to the mouth and ear. The diaphragm-plate in this instance is circular in form, and is confined between the bed-plate $g'$ and cap-plate $h'$, and also, at its outer edge, between two clamping-rings, $p$, which are provided with screws $p'$, whereby the diaphragm-plate can only be strained evenly, unlike the straining-bar previously described. The bed-plate and cap-plate have corresponding apertures, and the bed-plate has a slight upwardly-turned edge, as before described.

The diaphragm-plate is of uniform thickness, and the diaphragm $C'$ is strained with uniformity; but it is graduated in its vibrating capacities, as in that previously described, because of its varying width, it being practically like that before described, and differing therefrom in being in the form of a scroll for occupying the circular telephone.

A series of seven bar-magnets, $B'$, are arranged in a curved line, so that each is in central contact with the diaphragm, substantially as previously described. Approximately desirable results may be attained with a single cylindrical or a tubular magnet arranged with relation to the diaphragm, substantially as shown.

The mouth-piece $E'$ has the usual funnel-shaped exterior aperture, $m'$, and a reversely funnel-shaped recess, $n^1$, the outer boundary of which is adjacent to the curved central line of the diaphragm, and a central conical block, $n^2$, serves to guide the sound from the outer aperture directly to the central portion of the diaphragm.

The hand-telephone, Figs. 8, 9, and 10, has an ordinary mouth-piece.

The diaphragm $D^2$ is lozenge-shaped, with rounded sides and ends, and is thicker at the central transverse line than at either end, the under surface being straight for contact with the magnet. In this case the bed-plate and cap-plate are as before described, these being secured together and confined between the mouth-piece and the body of the telephone. This magnet is composed of two T-shaped pieces of soft iron, $q$, having magnet-wire, as shown, and which form the poles of the magnet. These pieces are clamped between two permanent magnets, $r$, and the poles are so adjusted that the action of the magnet is in a straight line coincident with the central longitudinal line of the diaphragm.

When my improved diaphragm is acted upon by a magnet or magnets near its central longitudinal line, or when used in a phonograph and acting upon a number of points to record and reproduce vibrations, it will respond to the inflexions of the human voice, and when used in a speaking-telegraph it will produce such electric pulsations as will reproduce in the receiving-instrument the original sounds or tones.

In a phonograph, when the vibrations are recorded by the pin which is in contact with a part of the diaphragm, and the vibrations of that part are reproduced by the passage of the foil under the pin, there will occur a vibration of those parts of the diaphragm which are in unison with the overtones of the tone or tones actually reproduced, and thus complete the harmony; or the different vibrations of different portions of the diaphragm may be separately recorded by separate pins, and the vibrations thereby reproduced are as above stated, but the sound is increased in volume.

In adjusting the magnet to an elongated diaphragm, as in Figs. 1 to 5, it is placed farther from the diaphragm at its wide end than at the narrow end, because of the difference in the fullness or extent of the vibrations.

It will be obvious that my diaphragms are applicable to telephones in which carbon buttons or other means for regulating the electric current are used, it being only necessary that said means be placed in contact with various portions of the diaphragm.

In each of the telephones shown it will be observed that the magnet is so arranged with relation to the diaphragm that the lines of vibration will be across or at right angles to the line of the magnet; and a similar result is attainable when with an oval or a round diaphragm not graduated in tension or thickness the magnet is similarly arranged, for then the lines of vibration will be at right angles to the line of the magnet.

Having thus described my invention, I claim as new and desire to secure by Letters Patent—

1. A diaphragm which is variably tuned, substantially as described, whereby it possesses a graduated vibrating capacity, as set forth.

2. A diaphragm which is graduated in thickness, substantially as described.

3. A diaphragm which is graduated in width, substantially as described.

4. A diaphragm which is unequally strained, substantially as described.

5. The combination, with a diaphragm which is variably tuned, of a magnet or magnets arranged to engage with the diaphragm in a continuous line, or nearly so, substantially as described, whereby the vibrations of the diaphragm will occur in lines at right angles to the line of the magnet or magnets, as set forth.

6. The combination, with a diaphragm, of a straining-bar, D, substantially as described, whereby the diaphragm may be unequally strained, as set forth.

7. The mouth-piece E, having a funnel-shaped outer aperture and an interior elongated funnel-shaped chamber communicating centrally with the center of the outer aperture, substantially as described.

R. EICKEMEYER.

Witnesses:
T. MÜLLER,
GEORGE HARR.